C. LINDEN.
SNAP GAGE.
APPLICATION FILED MAR. 15, 1919.
1,322,029.
Patented Nov. 18, 1919.
2 SHEETS—SHEET 1.
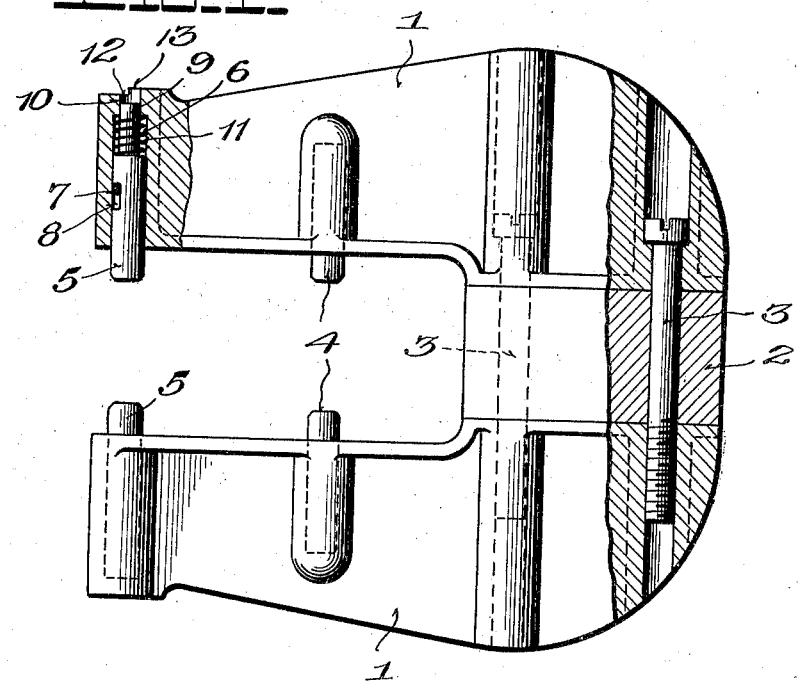
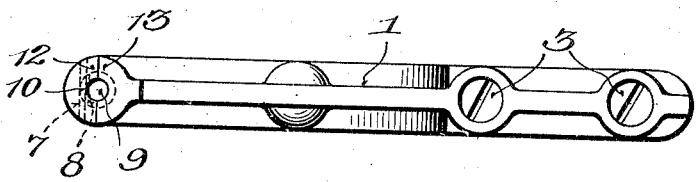
Inventor
Charles Linden
By
Attorney

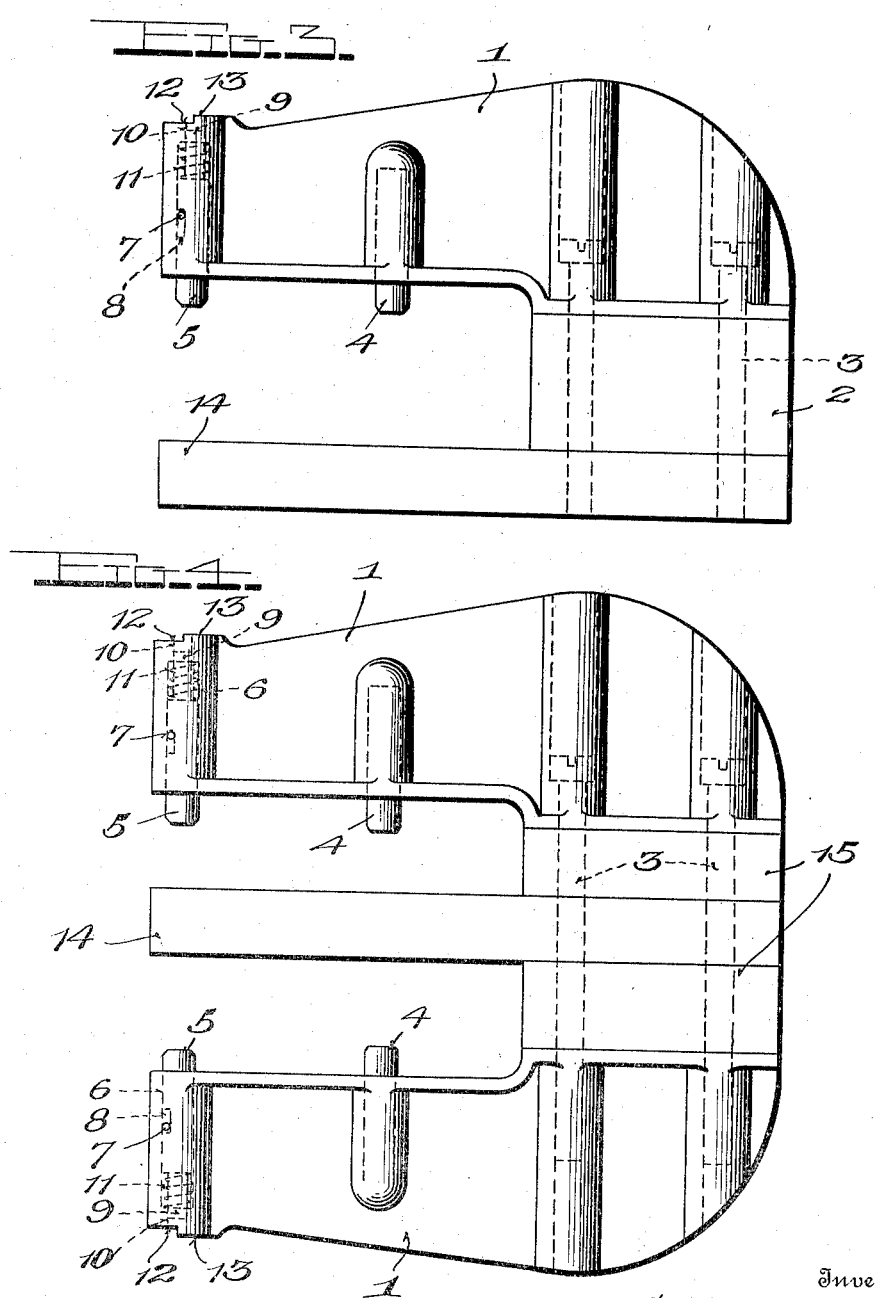

UNITED STATES PATENT OFFICE.

CHARLES LINDEN, OF STRATFORD, CONNECTICUT.

SNAP-GAGE.

1,322,029.  Specification of Letters Patent.  Patented Nov. 18, 1919.

Application filed March 15, 1919. Serial No. 282,882.

*To all whom it may concern:*

Be it known that I, CHARLES LINDEN, a citizen of the United States, residing at the town of Stratford, in the county of Fairfield and State of Connecticut, have invented certain new and useful Improvements in Snap-Gages; and I do declare the following to be a full, clear, and exact description of the invention, such as will enable others skilled in the art to which it appertains to make and use the same.

This invention relates to certain new and useful improvements in a snap gage and more particularly to a gage especially adapted for measuring and gaging work having a standard dimension of thickness. The principal object is to provide a snap gage having two sets of measuring pins, one set comprising stationary pins for measuring standard work of uniform thickness and the other set comprising a yieldable pin permitting a latitude of measurement from the standard work.

The invention also resides in specific features of construction hereinafter described and claimed, reference being had to the accompanying drawings wherein;

Figure 1 is a side elevation of the preferred embodiment of the invention, parts being in section to more clearly disclose the construction;

Fig. 2 is a top edge view thereof;

Fig. 3 is a side elevation of a modified form of the invention; and

Fig. 4 is a similar view of a further modification of the invention.

Referring more in detail to the drawing and particularly Figs. 1 and 2, the numerals 1 designate the arms or body members that have a removable spacing block 2 secured therebetween by screw fastenings 3, the arrangement of the parts forming a U-shaped structure between the arms of which the work is inserted for measuring. To this end a pair of stationary pins 4 is fixed in opposing sockets adjacent the inner ends of the arms 1 for standard measurements, and a pair of pins 5 is disposed in a similar manner adjacent the outer ends of said arms.

One pin 5 is stationary while the other pin 5 is mounted to slide in a socket or chamber 6 and is limited in its sliding by a transverse pin 7 extending within a cut out or recess 8 in the periphery of the pin. A reduced stem 9 forms the inner end of this movable pin and extends through the opposing end wall of the chamber and operates in a reduced bearing 10. A coiled spring 11 encircles the stem and is confined between the inner end wall of the bearing 10 and the enlarged portion of the pin 5 to afford a yieldable mounting for the latter. The bearing 10 opens through the outer surface of arm 1 which is stepped to provide two faces 12 and 13 spaced a predetermined distance apart axially of the gage pin.

Normally, the space intervening pins 5 is considerably less than that between the standard gage pins 4 and when a standard piece of work, which exactly fits between said pins 4, is inserted between the pins 5 the yieldable pin 5 is pushed outwardly until the outer end of stem 9 is at a point midway between the two gaging faces or levels 12 and 13. Thus, when work of standard gage is inserted from the front or in contact with the relatively yieldable pin, it will thrust said pin back or outwardly. But, should a piece of work be inserted between the standard gage pins 4, and the measurement be ascertained to be somewhat less than standard gage, such work is then inserted between the pins 5, and if the end of the stem 9 is not thereby projected at least flush with the face 12, such work is rejected as undersize. Should work, inserted between these pins 5, thrust the stem 9 beyond the face 13, such work is rejected as being oversize.

But any work inserted between the pins 5 is accepted, if it does not force the slidable pin either below the face 12 or beyond the face 13, since the proper gage difference between the two faces is only one one-thousandth of an inch, while the standard gage position of the end of the stem 9 is midway between these faces. It therefore follows that the difference between these faces 12, 13, and the standard gage position of the stem 9 is one two-thousandths of an inch, and a variation such as this is immaterial.

Of course, in gages for finer or coarser work, this ratio would be different.

In the form of invention depicted in Fig. 3 and known as the bench gage, one arm is replaced by a bed plate 14 serving as a common gage contact for both the stationary pin 4 and the yieldable pin 5.

A double gage is illustrated in Fig. 4 and consists of a common bed plate 14 having gage blocks 15 secured on opposite sides to space their respective arms 1 from the plate at varying distances. This construction enables the user to gage two different standard grades of work with but the one instrument.

The inner faces of the arms 1 where they contact the spacing block should always be in the same plane with the stationary pins 4, and should the latter become worn, it is merely necessary to separate said arms and block and grind said faces and pins so that they will be in such plane. The spacing block, of course, always remaining the same.

Having thus described my invention what I claim as new and desire to secure by Letters Patent is:—

1. A snap gage including spaced members each having a standard gaging surface carried fixedly thereby, said surfaces being opposed to one another, one of said members having therein a socket, a gage pin yieldably supported within said socket which is open at both ends, said pin being adapted to be projected through said socket and having one end opposed by a stationary gaging surface on the other member, from which surface said end is normally spaced by a distance less than that between said standard surfaces, and means coöperating with the other end of the pin for defining the standard, and minimum and maximum outwardly-projected positions of the pin.

2. A snap gage comprising a pair of opposing members, a gage block of predetermined width connecting the members at their rear end and serving as a sustaining spacer therefor, stationary standard gage pins fixedly carried by said members and projecting from the inner faces thereof near said block and in opposing relation, a gage pin fixedly carried by one of said members and projecting from the inner face thereof near the outer end, and a resiliently yieldable gage pin opposing the last named pin and slidable within an opening formed in one of said members, the latter provided at its outer edge adjacent said opening with stepped gaging surfaces.

3. A snap gage comprising a pair of opposing members, a gage block of predetermined width connecting the members at one end and serving as a sustaining spacer therefor, said members having fixed standard gage pins projecting in opposing relation from the inner edges of said members, the forward extremity of one of said members having an opening therethrough from the inside edge to the outside edge which opening at the outside edge leads into a stepped formation the distance between the stepped faces being predetermined, a resiliently yieldable gage pin slidable within said opening and adapted when forced outwardly to register with said stepped formation, and a stationary gage pin fixed to the member opposite said resiliently yielding pin, the distance between these last named pins being normally less than that which separates the standard gage pins.

In testimony whereof I affix my signature.

CHARLES LINDEN.